United States Patent [19]

Miyake

[11] Patent Number: 4,765,692
[45] Date of Patent: Aug. 23, 1988

[54] ANTISKID CONTROL SYSTEM FOR VEHICLE WITH ELECTROMAGNETIC VALVE HAVING THROTTLED POSITION

[75] Inventor: Katsuya Miyake, Saitama, Japan

[73] Assignee: Akebono Brake Industry Co., Ltd., Tokyo, Japan

[21] Appl. No.: 937,092

[22] Filed: Dec. 2, 1986

[30] Foreign Application Priority Data

Dec. 10, 1985 [JP] Japan .................. 60-277346

[51] Int. Cl.$^4$ .............. B60T 8/00; B60T 8/36; B60T 13/68; B60T 15/02
[52] U.S. Cl. .................. 303/119; 188/181 R; 303/61; 303/68; 303/110; 303/116
[58] Field of Search ............... 303/119, 92, 113, 111, 303/116, 114, 117, 115, 100, 110, 61–63, 68–69; 188/181 A, 181 R; 60/591, 545

[56] References Cited

U.S. PATENT DOCUMENTS

| | | | |
|---|---|---|---|
| 3,550,966 | 12/1970 | Leiber | 303/119 |
| 3,731,980 | 5/1973 | Fink et al. | 303/119 |
| 4,099,793 | 7/1978 | Iio | 303/119 X |
| 4,589,706 | 5/1986 | Leiber | 303/119 X |
| 4,602,824 | 7/1986 | Nishimura et al. | 303/116 X |
| 4,603,920 | 8/1986 | Otsuki et al. | 303/119 X |
| 4,640,558 | 2/1987 | Nomura et al. | 303/119 |
| 4,668,024 | 5/1987 | Nakanishi et al. | 303/119 |
| 4,687,260 | 8/1987 | Matsui et al. | 303/119 |

FOREIGN PATENT DOCUMENTS 1305430 1/1973 United Kingdom .

Primary Examiner—Douglas C. Butler
Attorney, Agent, or Firm—Toren, McGeady & Associates

[57] ABSTRACT

An antiskid control system wherein the conventional method of performing an opening/closing change-over operation by a pulse train signal on a electromagnetic valve for increasing hydraulic braking pressure at a variable rate of increase is not employed but the pressure increasing rate is arranged to be variable by the use of an electromagnetic valve having some throttled position.

2 Claims, 4 Drawing Sheets

ANTISKID CONTROL SYSTEM FOR VEHICLE WITH ELECTROMAGNETIC VALVE HAVING THROTTLED POSITION

BACKGROUND OF THE INVENTION

1. Field of the Invention

This invention relates to an antiskid control system for adequately controlling the rotational behavior of vehicle wheels during brake application.

2. Description of the Prior Art

Heretofore, antiskid systems of varied kinds have been proposed and arranged in different manners to reduce hydraulic braking pressure for avoiding an inadequate wheel braking state incurring a locked state of vehicle wheels and then to increase the reduced braking pressure to prevent the braking distance from unnecessarily extending. The known antiskid control methods include, for example, a method in which: An electromagnetic valve device which is operable at a relatively high frequency is arranged in a braking pressure increasing system in such a way as to permit selection of a braking pressure increasing rate out of various pressure increasing rates; a pulse train generator, such as a multivibrator or the like, is included in a driving control system provided for the electromagnetic valve device; and the timing at which the electromagnetic valve device is driven by a pulse train signal from the multivibrator is determined on the basis of a signal representing the acceleration of vehicle wheel rotating velocity. This method was disclosed, for example, in British Pat. No. 1,305,430.

In the method of providing an electromagnetic valve device in the hydraulic braking pressure increasing system and operating it by introducing a given pulse train signal presents problem in terms of the durability of the expensive electromagnetic valve device because of a frequent repetition of collision and parting taking place within a very short period of time between a valve seat and a valve body.

FIG. 7 of the accompanying drawings shows by way of example the arrangement of an antiskid control system employing the above-stated conventional hydraulic braking pressure increasing method. The illustration includes a gate valve 1; an electromagnetic valve device for increasing or holding hydraulic braking pressure (hereinafter referred to as a hold valve) 2; an electromagnetic valve device for reducing hydraulic braking pressure (hereinafter referred to as a pressure reducing valve) 3; a main transmission line 4 which connects a master cylinder M/C (not shown) to the wheel cylinder W/C of each vehicle wheel brake device via the gate valve 1 and the hold valve 2 for transmitting the hydraulic braking pressure from the master cylinder M/C.

The gate valve 1 includes cylinders 6 and 7 which are of the same diameter and have a differential pressure operated piston 5 inserted therein. During antiskid control, a valve part 8 of the gate valve 1 is closed when the piston 5 is moved toward the left side in the drawing by a difference between the amounts of hydraulic pressure applied to the two sides of this piston. When this valve part 8 is closed, communication in terms of pressure between the side of master cylinder M/C and the downstream side of the gate valve (on the side of the wheel cylinder W/C) is shut off.

The hold valve 2 is of a normally open type and is arranged to be closed by a hydraulic pressure holding signal $S_1$ produced from a control circuit 9 which is an electronic control device. With the hold valve 2 thus closed, the main transmission line 4 is blocked and there obtains a hydraulic pressure holding state. The pressure reducing valve 3 is of a normally closed type and is arranged to be opened by a pressure reducing signal $S_2$ produced from the control circuit 9. With the valve 3 opened, the pressure oil within the wheel cylinder W/C is taken up into a pressure accumulator 12 via a reservoir 10 and a pump 11. Between the gate valve 1 and the hold valve 2, there is provided a bypass line 13 for returning the taken up pressure oil. Reference numerals 14 and 15 denote a check valve and a return valve. A wheel rotating velocity detector (or a speed sensor) 16 is mounted on a wheel 17 and is arranged to supply the control circuit 9 with detection information.

With the antiskid control system arranged in this manner, the hydraulic braking pressure is increased by transmitting the pressure oil taken up into the pressure accumulator 12 to the wheel cylinder W/C by performing an opening/closing change-over operation on the hold valve 2. In that instance, in order to make the pressure increasing rate variable, the signal $S_1$ to be applied from the control circuit 9 to the hold valve 2 must be arranged in the form of a high frequency pulse train signal. Therefore, there arises the above-stated problem with regard to the durability of this hold valve.

SUMMARY OF THE INVENTION

The present invention is directed to the solution of the above-stated problem presented by the prior art system. It is therefore an object of the present invention to provide an antiskid control system wherein the conventional method of performing an opening/closing change-over operation by means of the pulse train signal on the electromagnetic valve for increasing hydraulic braking pressure at a variable rate of increase is not employed but the pressure increasing rate is arranged to be variable by the use of an electromagnetic valve having some throttled position.

The details of this invention will become apparent from the following description of embodiments thereof given with reference to the accompanying drawings.

DETAILED DESCRIPTION OF THE PREFERRED EMBODIMENTS

EXAMPLE 1

Figure 1:
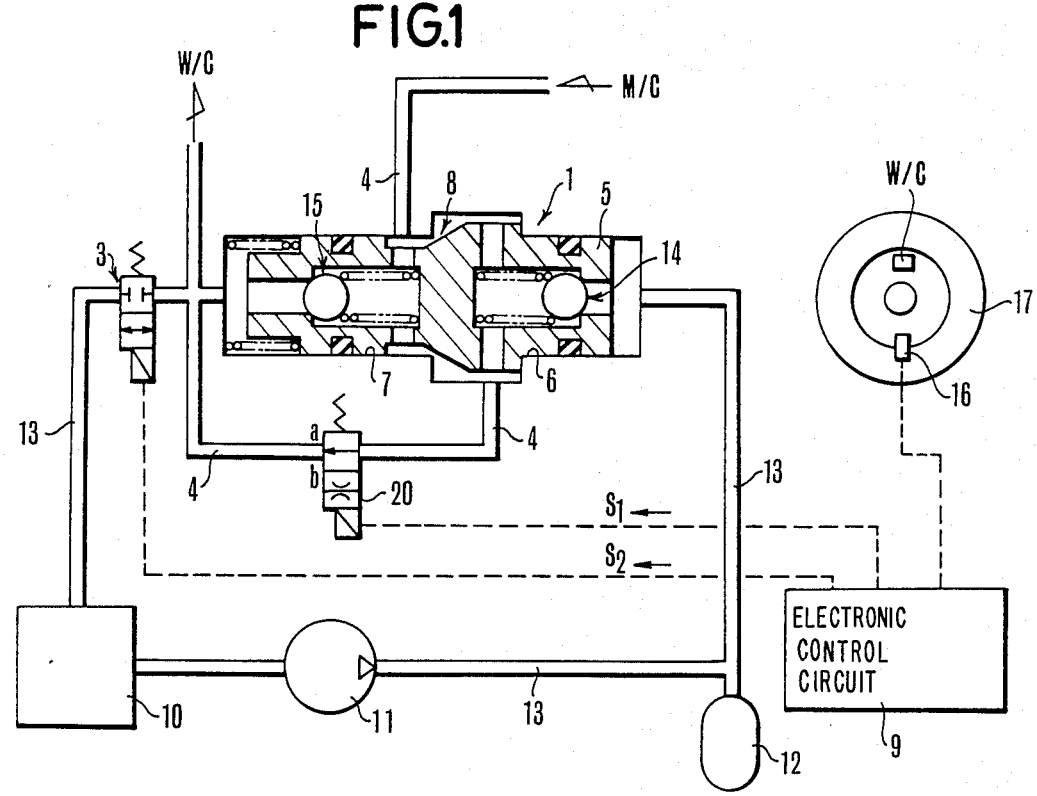
FIGS. 1, 3 and 5 are illustrations respectively showing in outline the arrangement of antiskid control systems arranged according to this invention as the first, second and third examples thereof.

FIG. 1 shows an example of this invention. The embodiment is arranged in the same manner as the conventional system shown in FIG. 7 with the exception of that the hold valve 2 of the conventional system is replaced with a pressure increasing valve 20 which is arranged as follows: Referring to FIG. 1, the illustration includes a gate valve 1; a pressure reducing valve 3; a main transmission line 4; a differential pressure operated piston 5; cylinders 6 and 7; a valve part 8; a reservoir 10;

a pump 11; a pressure accumulator 12; a by-pass transmission line 13; a check valve 14; and a return valve 15. It is a feature of this example that the pressure increasing valve 20 inserted in the main transmission line 4 on the downstream side of the gate valve 1 is arranged to be shiftable between a fluid passage opening position a and a fluid passage throttling position b. The valve 20 normally remains in the open position a. When it is necessary to reduce hydraulic braking pressure or to moderate the pressure increase, the valve 20 can be changed from the open position a over to the throttle position b. This change-over is arranged to be accomplished by the control circuit 9 according to the rotational behavior of the vehicle wheel.

The following is a description of the operation of the antiskid control system shown in FIG. 1.

Normally, the pressure increasing valve 20 is at its fully open position a while the pressure reducing valve 3 is closed. Therefore, when a braking pedal (not shown) is pressed down, the hydraulic pressure generated within the master cylinder M/C is transmitted through the passage 4 to the wheel cylinder W/C of the braking device, thus increasing the hydraulic braking pressure. The information sent from a wheel speed sensor 16 at this time is evaluated at the control circuit 9, and when the wheel 17 tends to be locked, the control circuit 9 produces a signal $S_1$ and changes over the pressure increasing valve 20 to the throttling position b, thus holding the rate of increase of the hydraulic braking pressure to a low level. As the locking tendency further advances, the control circuit 9 produces a signal $S_2$ for changing over the pressure reducing valve 3 to an open position, thus having the wheel cylinder W/C of the braking device communicating with the reservoir 10, thereby reducing the hydraulic braking pressure and, at the same time, driving the pump 11 for pumping up the fluid of the reservoir 10 to the pressure accumulator 12 for accumulating the same. At this time, the differential pressure operated piston 5 of the gate valve 1 moves to the left side as shown in the drawing by the difference in the hydraulic pressure generated at its both ends, shutting off the communication between the master cylinder M/C and the wheel cylinder W/C of the braking device by its valve part 8. Therefore, the pulsatory variation in the hydraulic pressure derived from the driving of the pump 11 will not be transmitted to the master cylinder M/C. And as the wheel speed tends to be restored, the signal $S_2$ from control circuit 9 disappears and the pressure reducing valve 3 is closed. At this time, the hydraulic pressure of the pressure accumulator 12 is throttled by the pressure increasing valve 20 and transmitted from the check valve 14 housed in the differential pressure operated piston 5 of the gate valve 1 to the wheel cylinder W/C of the braking device, and the hydraulic braking pressure increases moderately. As the wheel speed is restored further, the signal $S_1$ from the control circuit 9 disappears and the pressure increasing valve 20 is changed over to the fully open position a, and the hydraulic braking pressure increases quickly. As the wheel tends to be locked again by the quick increase of the hydraulic braking pressure, the pressure increasing valve 20 is changed over to the throttling position b by the signal $S_1$ from the control circuit 9, and the hydraulic braking pressure increases moderately. As the wheel speed lowers and the locking tendency advances further, the pressure reducing valve 3 is opened again by the signal $S_2$ from the control circuit 9, then repeating the above-described control procedures.

Figure 2:
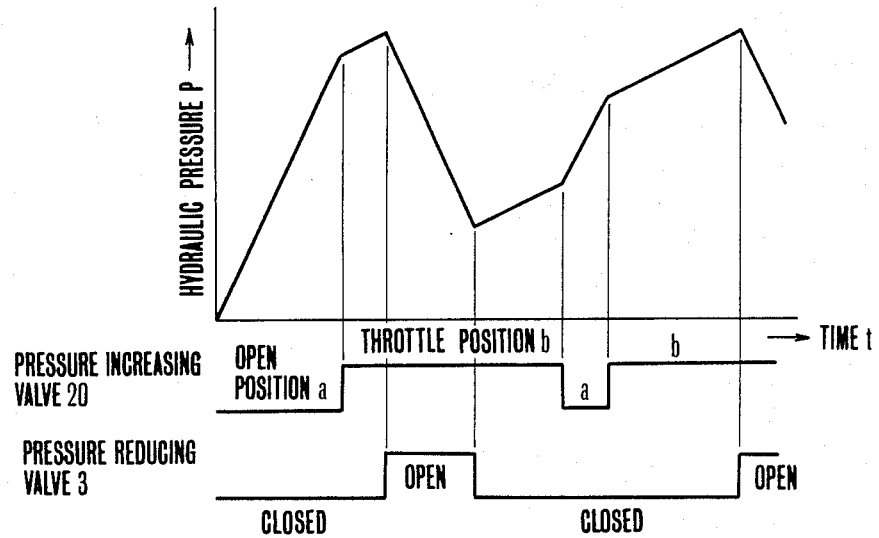
FIGS. 2, 4 and 6 show the hydraulic braking pressure varying characteristics of the first, second and third examples.

FIG. 2 shows by way of example the hydraulic braking pressure reducing/increasing control characteristic of the antiskid control system described above with regard to the system in FIG. 1.

EXAMPLE 2

Figure 3:
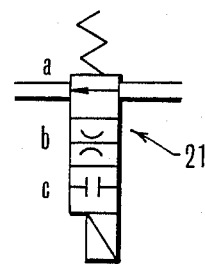

Referring to FIG. 3, in the case of a second embodiment, the pressure increasing valve 20 included in the control device of FIG. 1 is modified to have three different change-over positions as indicated by a reference numeral 21. With the exception of the pressure increasing valve 21, all the rest of the system are identical with that of FIG. 1 and are therefore omitted from description given here. A reference symbol c denotes an additional change-over position of the valve 21. In other words, the three positions include the normal open position a; the throttle position b; and the added position c which is a shut-off or closed position. When the hydraulic braking pressure must be either reduced or held at the same level, the pressure increasing valve 21 is shifted into the closed position c. When the hydraulic braking pressure increase must be eased down, the valve 21 is shifted to the throttle position b under the control of the control circuit 9.

The following description of the control in the Example in FIG. 3 is made in a manner finer than that in the Example in FIG. 1, since the pressure increasing valve 21 is made into a three position change-over type. When the wheel tends to be locked at the time of braking, the pressure increasing valve 21 is first changed over to a fluid passage shutting off position by the signal $S_1$ from the control circuit 9, thus maintaining the hydraulic pressure within the wheel cylinder W/C of the braking device at a predetermined value. As the wheel speed is further reduced and the locking tendency advances, the pressure reducing valve 3 is changed over to an open position by the signal $S_2$ from the control circuit 9, thus lowering the hydraulic braking pressure. And as the wheel speed tends to be restored, the pressure reducing valve 3 is closed by an instruction of the control circuit 9 and the hydraulic braking pressure will be maintained at a predetermined value. Then the pressure increasing valve 21 is changed over to the throttling position b by the signal $S_2$ from the control circuit 9 and the hydraulic braking pressure moderately goes up. And the pressure increasing valve 21 is changed over in turn to the fully open position a, the throttling position b, the fluid passage shut off position c by an instruction from the control circuit 9 according to a state of the wheel speed. Thus, the hydraulic braking pressure is controlled.

In this embodiment also, the gate valve 1 is closed during the hydraulic braking pressure control operation as in the Example of FIG. 1. Therefore, pulsatory variations in the hydraulic pressure derived from the driving of the pump 11 will not be transmitted to the master cylinder M/C.

Figure 4:
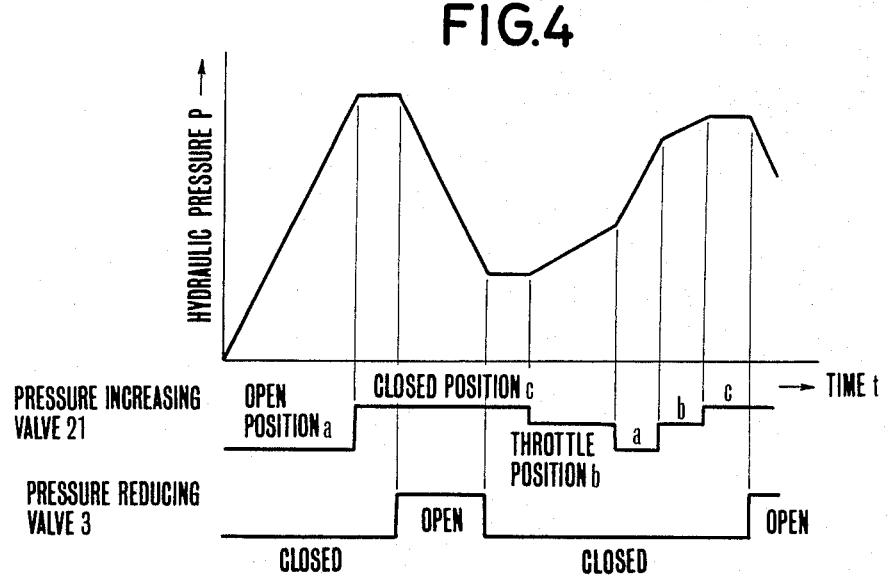

FIG. 4 shows by way of example the hydraulic braking pressure reducing/increasing control characteristic of the second embodiment described above and displayed in FIG. 3.

EXAMPLE 3

Figure 5:
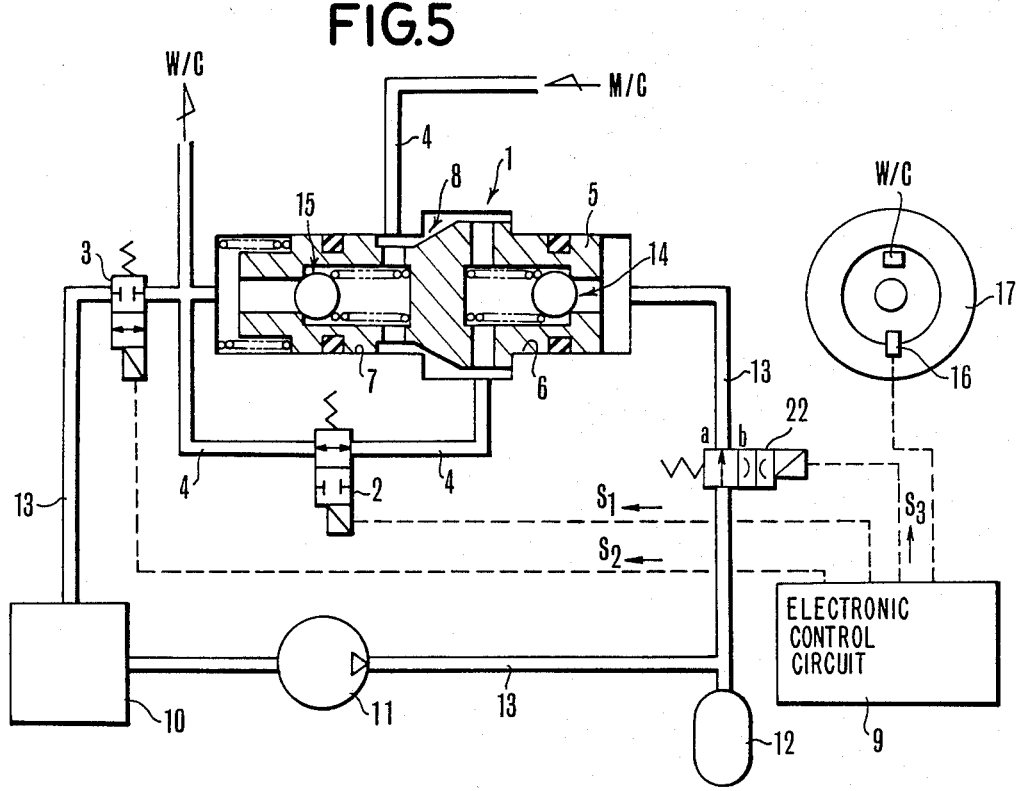
Figure 7:
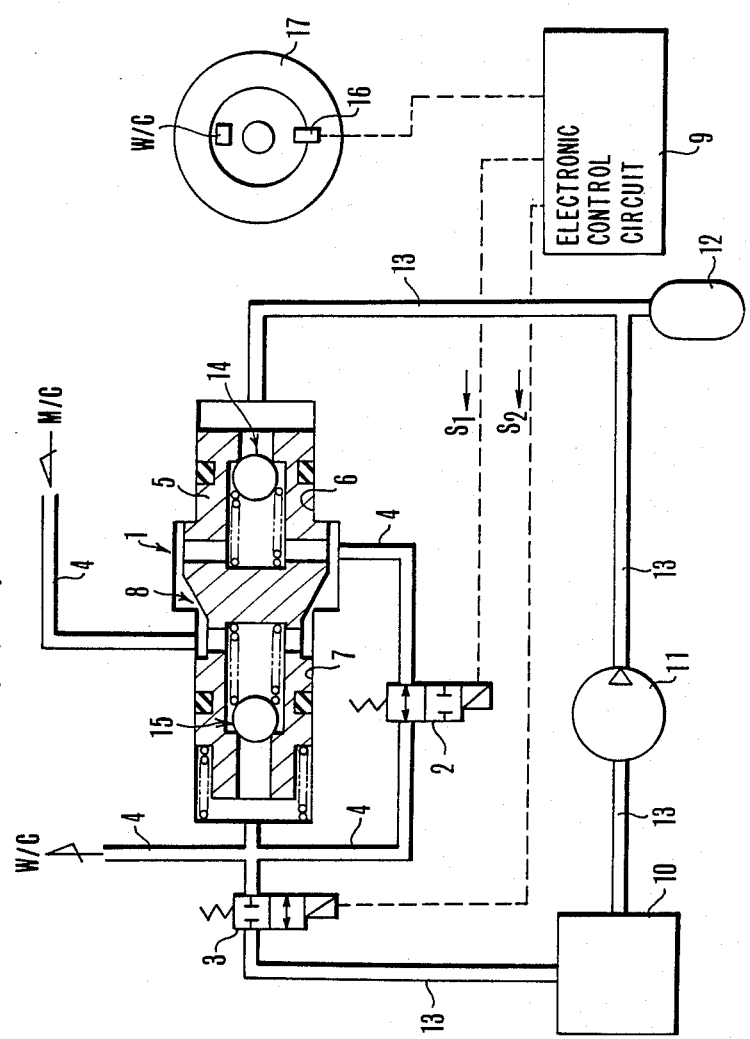
FIG. 7 is a schematic illustration showing by way of example the arrangement of the conventional antiskid control system.

FIG. 5 shows the arrangement of another embodiment of this invention. In this case, the conventional antiskid control circuit shown in FIG. 7 is changed to have a pressure increasing valve 22 interposed in between the pressure accumulator 12 and the check valve 14. The pressure increasing valve 22 is arranged to be normally in an open position a and to be shifted to a throttle position b by a moderate pressure increasing signal $S_3$ produced from the control circuit 9. The valve 22 is thus shiftable between two position.

In the case of this embodiment, the hold valve 2 and the pressure increasing valve 22 are arranged to operate in association with each other in such a manner that the pressure increasing operation can be selected between a moderate increase and a quick increase.

The following is an explanation of the operation of the antiskid control system exhibited in FIG. 5.

Normally since the hold valve 2 is opened and the pressure reducing valve 3 is closed, the hydraulic pressure of the master cylinder M/C generated by a pressing down of a braking pedal not shown in the drawing is transmitted to the wheel cylinder W/C of the braking device through the transmission line 4, thus increasing the hydraulic braking pressure. When the wheel 17 tends to be locked at this time, first the hold valve 2 is changed over to a closed position by the signal $S_1$ produced from the control circuit 9, and the hydraulic braking pressure will be maintained at a predetermined value. And as the locking tendency further advances, the pressure reducing valve 3 is changed over to an open position by the signal $S_2$ from the control circuit 9 and the wheel cylinder W/C of the braking device is communicated with the reservoir 10; therefore, the hydraulic braking pressure drops. At this time, the pump 11 is driven by an instruction from the control circuit 9 and the fluid of the reservoir 10 is pumped up and is accumulated in the pressure accumulator 12. Then the differential pressure operated piston 5 of the gate valve 1 is shifted to the left side in the drawing by the difference in the hydraulic pressure generated at the both ends thereof, and the communication between the master cylinder M/C and the wheel cylinder W/C of the braking device is shut off by its valve part 8. Therefore, pulsatory vibrations in the hydraulic pressure derived from the driving of the pump 11 will not be transmitted to the master cylinder M/C and; as the wheel speed tends to be restored, the signal $S_2$ disappears and the pressure reducing valve 3 is closed and, simultaneously, the pressure increasing valve 22 is changed over to the throttling position b by the signal $S_3$, and the hydraulic braking presure is maintained at a predetermined value. The signal $S_1$ then disappears and the hold valve 2 is opened, thereby the hydraulic braking pressure moderately goes up by the throttling effect of the pressure increasing valve 22. And as the wheel speed is further restored, the signal $S_3$ of the control circuit 9 disappears and the pressure increasing valve 22 is changed over to the fully opened position a, and the hydraulic braking pressure increases quickly. And as the wheel tends to be locked again, the pressure increasing valve 22 is changed over to the throttling position b and the hydraulic braking pressure is moderately increased. The hold valve 2 is then closed for maintaining the hydraulic braking pressure at a predetermined value. As the wheel speed lowers and the locking tendency advances further, the pressure increasing valve 22 is changed over to the fully open position a again by an instruction of the control circuit 9 and, simultaneously, the pressure reducing valve 3 is opened, thereafter the above mentioned control procedures will then be repeated.

Figure 6:
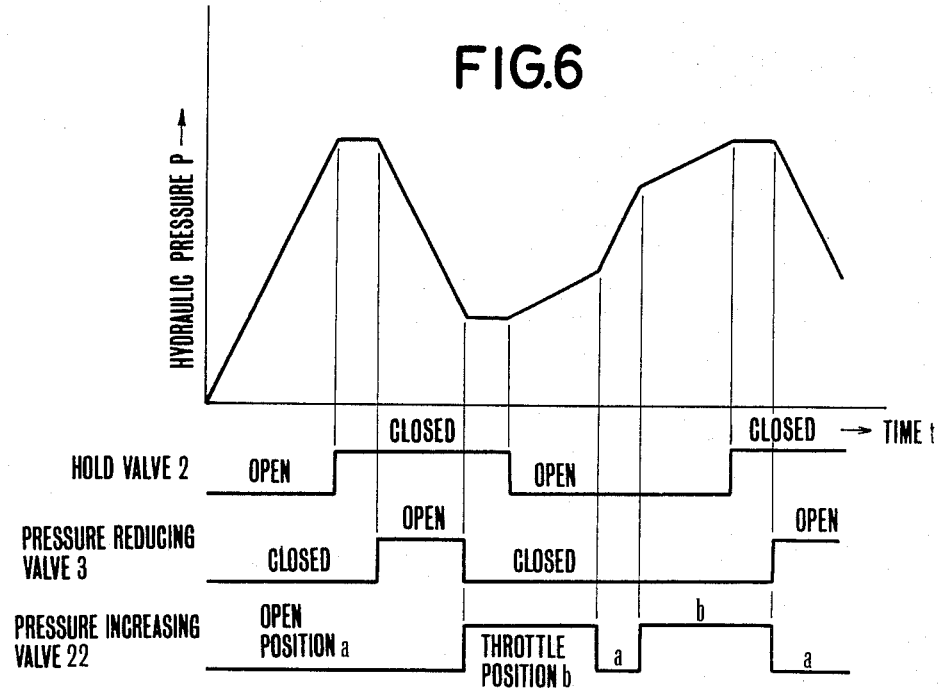

FIG. 6 shows by way of example the hydraulic braking pressure reducing/increasing control characteristic of the third embodiment of this invention set forth in FIG. 5.

In accordance with this invention, the hydraulic braking pressure can be increased at a variable rate for antiskid control by the use of an electromagnetic valve device which is arranged to have a throttle position. Since the antiskid control can be thus accomplished without having the electromagnetic valve operated at a high frequency, the durability of the valve can be increased. This invention, therefore, has a great utility.

What is claimed is:

1. An antiskid control system comprising:
    a holding pressure valve interposed in a main transmission line connecting a master cylinder and a wheel cylinder of a braking device for holding a hydraulic pressure of said wheel cylinder when it is changed over to a closed position;
    a pressure reducing valve of a normally closed type interposed at a by-pass transmission line branched out from said main transmission line at a downstream side of said holding pressure valve and releasing the hydraulic pressure of said wheel cylinder to a reservoir when the pressure reducing valve is changed over to an open position;
    a pressure accumulator being interposed within said by-pass transmission line for accumulating fluid pumped up from said reservoir by a pump;
    a gate valve of a normally open type interposed at the upstream side of said holding pressure valve within said main transmission line;
    said by-pass transmission line connecting said accumulator and said gate valve;
    a pressure increasing valve provided in said by-pass transmission line between said accumulator and said gate valve;
    said pressure increasing valve having a fluid passage throttling position and a fluid passage opening position;
    a differential pressure operated piston in said gate valve having one end on which the hydraulic pressure of said accumulator works and the other end on which the hydraulic pressure of said wheel cylinder works, and being shifted by the difference in the hydraulic pressure working on said both ends for shutting off the communication between said master cylinder and said holding pressure valve by closing a valve part of said piston within said gate valve; and
    said gate valve having a check valve housed within said differential pressure operated piston for allowing a flow of the fluid from said pressure increasing valve towards said holding pressure valve.

2. An antiskid control system according to claim 1, wherein the cross-sectional areas of the both ends of said differential pressure operated piston of the gate valve are equal.

* * * * *